(12) United States Patent
Takacs et al.

(10) Patent No.: US 10,395,633 B2
(45) Date of Patent: Aug. 27, 2019

(54) SOUND INSULATING SHEET MATERIAL WITH A CELLULAR STRUCTURE INCLUDING GELATINE AND/OR A PROCESS FOR PRODUCING THE SAME

(71) Applicant: ACOUSTIC SPACE PTY LTD, Annandale, New South Wales (AU)

(72) Inventors: Bela Takacs, South Bowenfels (AU); Philippe Pierre Marie Joseph Doneux, Annandale (AU)

(73) Assignee: ACOUSTIC SPACE PTY LTD (AU)

( * ) Notice: Subject to any disclaimer, the term of this patent is extended or adjusted under 35 U.S.C. 154(b) by 563 days.

(21) Appl. No.: 14/889,748

(22) PCT Filed: May 9, 2014

(86) PCT No.: PCT/AU2014/050031
§ 371 (c)(1),
(2) Date: Nov. 6, 2015

(87) PCT Pub. No.: WO2014/179844
PCT Pub. Date: Nov. 13, 2014

(65) Prior Publication Data
US 2017/0263234 A1    Sep. 14, 2017

(30) Foreign Application Priority Data
May 9, 2013   (AU) .................. 2013901646

(51) Int. Cl.
| | |
|---|---|
| *G10K 11/168* | (2006.01) |
| *G10K 11/162* | (2006.01) |
| *B32B 7/12* | (2006.01) |
| *B32B 15/09* | (2006.01) |
| *B32B 15/20* | (2006.01) |
| *B29D 7/01* | (2006.01) |

(Continued)

(52) U.S. Cl.
CPC .............. *G10K 11/168* (2013.01); *B29D 7/01* (2013.01); *B32B 5/18* (2013.01); *B32B 7/12* (2013.01); *B32B 15/09* (2013.01); *B32B 15/20* (2013.01); *B32B 27/065* (2013.01); *B32B 27/36* (2013.01); *E04B 1/8409* (2013.01); *G10K 11/162* (2013.01); *B29C 44/00* (2013.01); *B29C 44/20* (2013.01); *B29C 44/22* (2013.01); *B29C 44/24* (2013.01); *B29C 44/28* (2013.01); *B29C 44/32* (2013.01); *B29C 44/321* (2016.11); *B29C 44/56* (2013.01); *B29C 44/5681* (2013.01); *B29K 2089/00* (2013.01); *B29K 2105/16* (2013.01); *B29K 2509/02* (2013.01); *B32B 9/02* (2013.01); *B32B 9/04* (2013.01); *B32B 9/045* (2013.01); *B32B 27/06* (2013.01); *B32B 27/08* (2013.01); *B32B 27/18* (2013.01); *B32B 27/20* (2013.01); *B32B 37/12* (2013.01); *B32B 37/15* (2013.01); *B32B 2038/0084* (2013.01); *B32B 2250/02* (2013.01); *B32B 2250/03* (2013.01); *B32B 2250/04* (2013.01); *B32B 2266/02* (2013.01); *B32B 2266/124* (2016.11); *B32B 2305/02* (2013.01); *B32B 2305/022* (2013.01); *B32B 2307/102* (2013.01); *B32B 2307/304* (2013.01); *B32B 2307/3065* (2013.01); *B32B 2307/416* (2013.01); *B32B 2311/24* (2013.01); *B32B 2317/00* (2013.01); *B32B 2367/00* (2013.01); *B32B 2419/00* (2013.01); *B32B 2607/00* (2013.01); *C08K 3/01* (2018.01); *C08K 3/013* (2018.01); *C08K 3/16* (2013.01); *C08K 3/18* (2013.01); *C08K 3/26* (2013.01); *C08K 3/30* (2013.01); *C08K 5/14* (2013.01); *C08K 2003/166* (2013.01); *C08K 2003/265* (2013.01); *C08K 2003/3045* (2013.01); *C08L 3/02* (2013.01); *C08L 89/00* (2013.01); *C08L 89/06* (2013.01); *E04B 1/74* (2013.01); *E04B 1/82* (2013.01); *E04B 1/86* (2013.01); *E04B 2001/742* (2013.01); *E04B 2001/8461* (2013.01); *E04F 15/20* (2013.01); *G10K 11/165* (2013.01); *Y10T 428/249953* (2015.04); *Y10T 428/31681* (2015.04); *Y10T 428/31786* (2015.04)

(58) Field of Classification Search
None
See application file for complete search history.

(56) References Cited

U.S. PATENT DOCUMENTS

| | | | | | |
|---|---|---|---|---|---|
| 3,989,534 | A | * | 11/1976 | Plunguian ............... | C04B 28/02 |
| | | | | | 106/646 |
| 4,331,547 | A | * | 5/1982 | Stotts .................... | C04B 38/106 |
| | | | | | 106/122 |

(Continued)

FOREIGN PATENT DOCUMENTS

| | | |
|---|---|---|
| CN | 1557767 A | 12/2004 |
| CN | 101358484 A * | 1/2009 |

(Continued)

OTHER PUBLICATIONS

"Sodiium Percarbonate Q35—Evonik Treibacher" (2012).*

(Continued)

*Primary Examiner* — Vivian Chen
(74) *Attorney, Agent, or Firm* — Tarolli, Sundheim, Covell & Tummino LLP (57) ABSTRACT

A composition for producing a sheet material with a cellular structure, the composition including the following components: (a) about 5 to about 25 weight % gelatine, (b) about 25 to 60 weight % filler material, (c) about 15 to about 40 weight % water, and (d) a cellular structure promoting agent.

43 Claims, 1 Drawing Sheet

(51) Int. Cl.

| | | |
|---|---|---|
| B32B 5/18 | (2006.01) | |
| B32B 27/06 | (2006.01) | |
| B32B 27/36 | (2006.01) | |
| E04B 1/84 | (2006.01) | |
| B32B 37/12 | (2006.01) | |
| B32B 37/15 | (2006.01) | |
| B32B 27/08 | (2006.01) | |
| B32B 27/18 | (2006.01) | |
| B32B 9/02 | (2006.01) | |
| B32B 27/20 | (2006.01) | |
| B32B 9/04 | (2006.01) | |
| B32B 38/00 | (2006.01) | |
| E04B 1/74 | (2006.01) | |
| E04B 1/82 | (2006.01) | |
| B29C 44/24 | (2006.01) | |
| B29C 44/20 | (2006.01) | |
| B29C 44/00 | (2006.01) | |
| B29C 44/32 | (2006.01) | |
| B29C 44/28 | (2006.01) | |
| B29C 44/56 | (2006.01) | |
| B29C 44/22 | (2006.01) | |
| C08L 89/00 | (2006.01) | |
| C08L 3/02 | (2006.01) | |
| C08L 89/06 | (2006.01) | |
| C08K 3/30 | (2006.01) | |
| C08K 3/013 | (2018.01) | |
| C08K 3/18 | (2006.01) | |
| C08K 5/14 | (2006.01) | |
| C08K 3/26 | (2006.01) | |
| C08K 3/16 | (2006.01) | |
| C08K 3/01 | (2018.01) | |
| G10K 11/165 | (2006.01) | |
| E04F 15/20 | (2006.01) | |
| E04B 1/86 | (2006.01) | |
| B29K 105/16 | (2006.01) | |
| B29K 509/02 | (2006.01) | |

(56) References Cited

U.S. PATENT DOCUMENTS

| | | | | |
|---|---|---|---|---|
| 4,732,964 A * | 3/1988 | Myers | C08G 63/181 | 428/343 |
| 4,867,902 A * | 9/1989 | Russell | A62D 9/00 | 252/186.27 |
| 4,938,784 A * | 7/1990 | Murakami | B24D 3/28 | 51/293 |
| 5,308,879 A * | 5/1994 | Akamatu | C08J 9/0085 | 106/122 |
| 5,312,486 A * | 5/1994 | Meyer | C04B 22/087 | 106/627 |
| 5,314,927 A * | 5/1994 | Kondo | B32B 27/10 | 521/159 |
| 5,360,828 A * | 11/1994 | Morrison | C08J 9/0085 | 106/122 |
| 5,382,285 A * | 1/1995 | Morrison | C08J 9/0085 | 106/122 |
| 5,429,830 A * | 7/1995 | Janovsky | A23G 3/42 | 426/306 |
| 5,457,136 A * | 10/1995 | Hartranft | C08J 9/0023 | 106/122 |
| 5,589,518 A * | 12/1996 | Bastioli | B29C 67/205 | 521/53 |
| 5,591,491 A * | 1/1997 | Ando | B29C 35/12 | 264/450 |
| 5,609,892 A * | 3/1997 | Garcia | B29B 9/065 | 264/142 |
| 5,710,190 A * | 1/1998 | Jane | C08J 9/104 | 426/440 |
| 5,851,420 A * | 12/1998 | Kim | C01B 15/103 | 252/186.27 |
| 5,851,461 A * | 12/1998 | Bakis | A61L 15/28 | 264/50 |
| 5,902,682 A * | 5/1999 | Bertsch-Frank | C01B 15/106 | 428/403 |
| 5,916,928 A * | 6/1999 | Sessions | B29C 44/321 | 264/55 |
| 5,922,379 A * | 7/1999 | Wang | A23J 3/26 | 106/162.5 |
| 6,006,481 A * | 12/1999 | Jacobs | B32B 5/18 | 52/309.9 |
| 6,093,481 A * | 7/2000 | Lynn | B32B 5/20 | 428/217 |
| 6,136,216 A * | 10/2000 | Fidler | C08J 9/0066 | 106/122 |
| 6,160,028 A * | 12/2000 | Dyer | C08F 291/00 | 521/63 |
| 6,162,839 A * | 12/2000 | Klauck | C04B 24/08 | 106/646 |
| 6,331,355 B1 * | 12/2001 | Tebbe | B29C 65/50 | 428/409 |
| 7,818,922 B2 * | 10/2010 | Ellis | E04D 13/1618 | 428/158 |
| 7,874,402 B2 * | 1/2011 | Doneux | B32B 5/02 | 181/284 |
| 8,448,389 B2 * | 5/2013 | Doneux | E04B 2/7409 | 428/34.5 |
| 9,505,896 B2 * | 11/2016 | Donnelly | C08J 9/0023 | |
| 2002/0096278 A1 | 7/2002 | Foster et al. | | |
| 2003/0078323 A1* | 4/2003 | Zhang | C08L 67/04 | 524/17 |
| 2003/0100635 A1* | 5/2003 | Ho | A24D 3/068 | 524/47 |
| 2005/0042437 A1* | 2/2005 | Ramesh | C08J 9/0066 | 428/304.4 |
| 2007/0122584 A1* | 5/2007 | Song | B32B 5/16 | 428/71 |
| 2008/0064776 A1* | 3/2008 | Weidinger | C08J 9/0066 | 521/85 |
| 2008/0116006 A1 | 5/2008 | Doneux et al. | | |
| 2008/0203350 A1* | 8/2008 | Doneux | B29C 47/025 | 252/62 |
| 2008/0268220 A1* | 10/2008 | Olliges | B65D 81/3865 | 428/219 |
| 2008/0314680 A1* | 12/2008 | Doneux | E04B 2/7409 | 181/290 |
| 2009/0232877 A1* | 9/2009 | Montes | A61K 31/74 | 424/447 |
| 2009/0305595 A1 | 12/2009 | Ogawa et al. | | |
| 2009/0317478 A1* | 12/2009 | Han | A61K 9/1647 | 424/497 |
| 2010/0248966 A1* | 9/2010 | Lynch | A01N 25/14 | 504/362 |
| 2011/0186381 A1 | 8/2011 | Ogawa et al. | | |
| 2011/0227254 A1* | 9/2011 | Reck-Glenn | B29C 43/003 | 264/328.17 |
| 2011/0247894 A1* | 10/2011 | Englert | C04B 28/14 | 181/294 |
| 2013/0203878 A1* | 8/2013 | Igualada | C08J 9/122 | 521/85 |
| 2013/0210947 A1* | 8/2013 | Weismantel | C08J 9/14 | 521/128 |
| 2014/0265523 A1* | 9/2014 | Wright | E21F 5/12 | 299/12 |
| 2018/0025715 A1* | 1/2018 | Doneux | E04B 1/8409 | 181/288 |

FOREIGN PATENT DOCUMENTS

| | | |
|---|---|---|
| CN | 102 603 352 A | 7/2012 |
| DE | 3423852 A * | 1/1986 |
| GB | 1003327 A * | 8/1965 |
| GB | 1308468 A | 2/1973 |
| JP | 08-092485 A * | 4/1996 |
| JP | 2003-253031 A * | 9/2003 |

(56) References Cited

FOREIGN PATENT DOCUMENTS

| JP | 2004-027150 A | * | 1/2004 |
|----|---------------|---|--------|
| JP | 2007-186556 A | * | 7/2007 |
| JP | 2007-284325 A | * | 11/2007 |
| JP | 2010-196042 A | * | 9/2010 |
| WO | 2006/053393 A1 | | 5/2006 |
| WO | WO 2010/081918 A | * | 7/2010 |
| WO | WO 2013/067600 A1 | | 5/2013 |

OTHER PUBLICATIONS

"Wikipedia—Magnesium Chloride" ("https://en.wikipedia.org/wiki/Magnesium_chloride") (webpage retrieved Dec. 8, 2018). Year: 2018).*

"Wikipedia—Cellulose Fiber" ("https://en.wikipedia.org/wiki/Cellulose_fiber") (webpage retrieved Dec. 8, 2018). (Year: 2018).*

"Pubchem—Glycerin" ("https://pubchem.ncbi.nim.nih.gov/compound/glycerol") (webpage retrieved Dec. 4, 2018). (Year: 2018).*

Nafchi, Abdorreza Mohammadi et al. "Thermoplastic starches: Properties, challenges, and prospects" Starch/Starke 2013, v65, pp. 61-72 (published Jan. 3, 2013). (Year: 2013).*

International Search Report for Application No. PCT/AU2014/050031 dated Aug. 14, 2014.

European Search Report for Application No. 14 79 4099 dated Dec. 15, 2016.

Office Action for Chinese Application No. 201480026367.9 dated Mar. 14, 2017.

* cited by examiner

SOUND INSULATING SHEET MATERIAL WITH A CELLULAR STRUCTURE INCLUDING GELATINE AND/OR A PROCESS FOR PRODUCING THE SAME

RELATED APPLICATIONS

The present invention is a U.S. National Stage under 35 USC 371 patent application, claiming priority to Serial No. PCT/AU2014/050031, filed on 9 May 2014; which claims priority from AU 2013901646, filed 9 May 2013, the entirety of both of which are incorporated herein by reference.

The present invention relates to a sheet material with a cellular structure which also includes sound dampening properties, and in particular to a composition for producing the sheet material that is also environmentally friendly. The present invention also relates to a process for producing the sheet material.

BACKGROUND

Sound dampening properties are found in materials with a high sound transmission loss. The sound transmission loss of a material is determined by various physical factors such as mass and stiffness. The mass per unit area of a material is the most important factor in controlling the transmission of sound through the material. The so-called mass law is worth repeating here, as it applies to most materials at most frequencies:

$$TL = 20 \log_{10}(m_s f) - 48.$$

where: TL=transmission loss (dB)
$m_s$=mass per unit area (kg/m$^2$)
f=frequency of the sound (Hz)

Stiffness of the material is another factor that influences TL. Stiffer materials exhibit "coincidence dips" which are not explained by the above mass law. The coincidence or critical frequency is shown by:

$$f_c = A/t$$

where: A is a constant for a material
t is the thickness of the material (mm)

An example of a composition that is commonly used to produce sheet material with sound dampening properties is what is termed a loaded vinyl. In such a composition, a material with a high density is combined with vinyl at formulation stage. The resulting product has a high density whilst still maintaining high flexibility and thereby providing sound dampening properties.

However, vinyl is a product derived from petroleum sources so its cost and production is directly linked to the oil price and dictated by oil supply. Furthermore, vinyl does not biodegrade easily and in addition produces toxic fumes when burnt. This poses a particular problem when a loaded vinyl is used in building applications.

Accordingly, there is a need for an alternative material that may be used to produce a sheet material with sound dampening properties and which overcomes the disadvantages of loaded vinyl.

One attempt at providing such a material is described in WO 2006/053393 which describes a composition for producing a sheet material consisting of water, gelatine, glycerine and a filler material. However, it was found that the sheet material produced from such a composition was not stable at temperatures above 25° C., particularly when packaged immediately after manufacturing and then exposed to the sun. The material was found to melt and lose shape, providing undesirable characteristics when using this material in building applications.

The present invention seeks to provide a composition for producing sheet material with sound dampening properties which addresses the issues outlined above. The present invention also seeks to provide a process for producing such a sheet material.

SUMMARY

In accordance with one aspect the present invention provides a composition for producing a sheet material with a cellular structure, the composition including the following components:
(a) about 5 to about 25 weight % gelatine,
(b) about 25 to about 60 weight % filler material,
(c) about 15 to about 40 weight % water, and
(d) a cellular structure promoting agent.

In one form the cellular structure promoting agent reacts with one or more of components (a), (b) and/or (c) to provide the cellular structure of the sheet material. In one form the cellular structure promoting agent reacts with one or more of components (a), (b) and/or (c) to produce a gas which forms a cellular structure in the composition which upon curing provides the cellular structure of the sheet material.

According to another aspect the present invention provides a composition for producing a sheet material with a cellular structure, the composition consisting essentially of the following components:
(a) about 5 to about 25 weight % gelatine,
(b) about 25 to about 60 weight % filler material,
(c) about 15 to about 40 weight % water,
(d) about 0.5 to about 2 weight % cellular structure promoting agent, and,
(e) about 10 to about 30 weigh % lubricating compound.

In one form in addition to components (a) to (e) the remaining balance of the composition is made up from components selected from one or more of the following: gluten, starch, one or more alkaline earth metals, colourant, fungicide, perfume and deodoriser.

In one form the cellular structure promoting agent is a composition including a peroxide group. In one form the cellular structure promoting agent is sodium percarbonate. In one form the cellular structure promoting agent reacts with the water in the composition to produce oxygen which provides the cellular structure in the composition. In one form the composition includes about 0.2 to about 5 weight % and preferably 0.5 to about 2 weight % of the cellular structure promoting agent. In another form the composition includes about 1 to about 2 weight % of the cellular structuring agent.

In one form the composition includes about 20 to about 30 weight % water.

In one form the composition further includes a lubricating compound such as for example ethylene glycol and propylene glycol, glycerine (glycerol). In one form the composition includes about 10 to about 30 weight % of the lubricating compound. In another form the composition includes about 10 to about 15 weight % of the lubricating compound. In one form the lubricating compound is glycerine.

In one form the composition further includes an alkaline earth metal chloride. In one form the composition includes about 1 to about 5 weight % of the alkaline earth metal chloride. In another form the composition includes about 1 to 2 weight % of the alkaline earth metal chloride. In one form the alkaline earth metal chloride is magnesium chloride.

In one form the composition further includes gluten. In one form the composition includes about 1 to about 5 weight % gluten. In another form the composition includes about 2 to about 4 weight % gluten.

In one form the composition includes starch. In one form the starch is included in the form of tapioca starch. In one form the composition includes about 1 to about 5 weight % starch. In another form the composition includes about 2 to about 4 weight % starch.

In one form the gelatine has a bloom of between about 220 and about 260. In one form the gelatine has a bloom of about 250. In one form the gelatine is type-B gelatine. In one form the composition includes about 5 to about 15 weight % of gelatine. In another form the composition includes about 10 to 15 weight % gelatine.

In one form the density of the filler material is greater than 1 g/cm3. In one form the density of the filler material is about 2.0 to about 5.0 g/cm3. In one form the filler material is selected from calcium carbonate and/or barium sulphate. In one form the composition includes about 30 to about 50 weight % of the filler material. In another form the composition includes about 35 to about 45 weight % filler material. In one form the filler material is chosen from a combination of calcium carbonate and barium sulphate. In one form the filler material is calcium carbonate.

In one form the composition further includes a fungicide.

In one form the composition further includes a deodoriser.

In one form the composition further includes a perfume compound.

In one form the composition further includes a colourant. In another form the colourant is water based.

According to another aspect the present invention provides a process for producing a sheet material with a cellular structure the process including the steps of:
a. preparing a composition including the steps of:
   i. providing 15 to about 40% water;
   ii. dissolving about 5 to about 25 weight % gelatine into the water to provide a first mixture;
   iii. mixing about 20 to about 60 weight % of a filler material into the first mixture to form a second mixture;
   iv. introducing a cellular structure promoting agent to the second mixture to form the composition, the above weight % calculated on the weight of the total composition,
b. forming the composition into a sheet; and
c. allowing the sheet to cure In one form the cellular structure promoting agent is selected from a composition including a peroxide group. In one form the cellular structure promoting agent is sodium percarbonate. In one form the cellular structure promoting agent reacts with the water in the composition to produce oxygen which provides a cellular structure in the composition which upon curing provides the cellular structure in the sheet material.

In one form the preparation of the composition at step a. is conducted at a temperature of about 75° C. to about 95° C. In one form step a. is conducted at a temperature of about 80° C.

In one form the filler material at step iii. is calcium carbonate.

In one form about 10 to about 30 weight % glycerine is added to the filler material before step a.iii. In an alternative form, about 5 to about 15 weight % glycerine is added to the water after step a.i. and the remaining about 5 to about 15 weight % glycerine is added after step a.ii. and before step a.iii.

In one form about 1 to 5 weight % of magnesium chloride is added to the water after step a.i. and before step a.ii.

In one form the cellular structure promoting agent is introduced to the second mixture about 1 minute to about 15 minutes before step b. In one form the cellular structure promoting agent is introduced to the second mixture about 2 minutes before step b.

In one form step b. includes pouring the composition onto a substantially horizontal surface to form a sheet.

According to another aspect the present invention provides a sheet material prepared from a composition as herein described or from a process as herein described.

In one form a further planar sheet material may be bonded to one or both planar faces of the sheet material to provide a layered sheet material. In one form the planar sheet material is composed of thermally bonded polyester sheeting or needle punched polyester sheeting. In one form the planar sheet material is thermally bonded polyester sheeting and the thermally polyester bonded sheeting is bonded to a further sheet material in the form of aluminium foil.

In one form the aluminium foil is bonded to the thermally bonded polyester sheeting using an adhesive in the form of a laminate.

DETAILED DESCRIPTION OF EMBODIMENTS

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

In certain embodiments the composition as herein is able to produce an acoustic sheet material with a cellular structure which has significant sound dampening characteristics. The sheet material once formed has a density of about 0.2 g/cm$^3$ (without fillers included in the composition) and a density when fillers are included of about 0.8 to 1.2 g/cm$^3$ up to a density of about 2.5 g/cm$^3$. In addition to the high density, the sheet material is very flexible and has a high elastic memory. The combination of the high density and the flexibility provides that the sheet material has excellent sound dampening properties.

As the composition of the present invention is made from non-petroleum based products, the sheet material produced from the composition is biodegradable and non toxic. Furthermore, the cost of the sheet material is independent from the oil price and oil supply.

Another advantage of the composition is that the resultant sheet material is fire retardant and does not give off toxic fumes when burnt in contrast to the alternative sound dampening sheet material product of loaded vinyl. This provides that the sheet material produced from the composition as herein described may be used extensively as a building material for various applications to provide a safer and greener alternative to loaded vinyl. The sheet material produced from the composition may also be used in areas which are subject to fire hazards such as for example in engine environments on boats and in heavy industry installations.

During the process to produce the sheet material with sound dampening properties, the composition may also be coloured by using any suitable colouring technique to produce sheeting in any colour that may be desired. Furthermore, prior to curing, the composition has excellent adhesion properties and does not therefore require a separate adhesive at the formation stage if is desired to bond the sheet material to another substrate. Alternatively, once the sheeting material has cured, the material is also compatible with most glues and adhesives such that a composite material may also be produced in this fashion.

It was found that the inclusion of a cellular structure promoting agent together with water, gelatine and a filler material provided a composition that when formed into a sheet or other structure and allowed to cure, provided a material with a cellular structure throughout its composition.

In certain embodiments the cellular structure promoting agent is selected from a compound that reacts with the one ore more of the other constituents of the composition for producing the sheet material thereby producing gas at the formation stage of the sheet which provides the cellular structure of the resulting composition when in sheet form.

One class of preferred cellular structure promoting agents is selected from compositions including a peroxide group such as for example the following compounds:

$2Na_2CO_3.3H_2O_2$ $(NH_4)_2SO_4.H_2O_2$ $K_2CO_3.H_2O_2$ $Na_2HPO_4.H_2O_2$ $Urea.H_2O_2$ In an alternative embodiment, the cellular structure promoting agent may also be selected from compositions including a persulfate group, such as for example sodium persulfate $Na_2S_2O_8$.

In a preferred embodiment the cellular structure promoting agent is selected from sodium percarbonate.

It was also surprisingly found that when the cellular structure promoting agent is in the form of a composition including a peroxide group (such as sodium percarbonate), the cellular structure promoting agent reacted with the water in the composition to produce a gas which is understood to be oxygen. The production of oxygen within the composition once the cellular structure promoting agent was included formed gas bubbles throughout the composition which were maintained throughout in the form of a cellular structure once the composition cured.

In addition, and without wishing to be bound by theory, it is also thought that the oxygen, made available to the gelatine within the composition by the reaction of the peroxide group with water as the gelatine begins to gel, provides for stronger cross-linking between the gelatine molecules as the composition is cured. The stronger cross-linking stabilises the "visco-elastic" properties of the cured sheet material produced from the composition in conditions of high humidity, low humidity and with temperature variation, such that the sheet material can perform without loss of structural integrity in temperatures from about minus 40° C. to about 180° C. (was tested in freezing conditions for over 90 days) as well as in dry and wet conditions.

This provides that the sheet material is easily about able to withstand temperatures of up to about 90° C. which can often occur if the sheet material is left out exposed to direct sunlight such as for example on a building site or when the sheet material is located within packaging made of plastic and the like. It was also found that the material maintained flexibility and the same visco-elastic properties even at very cold temperatures below 0° C.

With out wishing to be bound by theory it is thought that at least the inclusion of the cellular structure promoting agent and particularly, a cellular structure promoting agent that includes a peroxide group and/or the addition of a filler chosen from calcium carbonate provides that the structural integrity of the sheet material is maintained as the ambient temperature increases. This is in contrast to the composition described in WO 2006/053393 that tends to melt and become putty like and lose its structural integrity when exposed to temperatures above 25° C.

In addition, it was also found that the addition of a cellular structure promoting agent in the form of a peroxide group provided that the resulting material had increased resistance to the presence of hydrocarbons, oils and grease as well as water.

In certain embodiments there is provided a composition for producing a sheet material with a cellular structure, the composition consisting of the following components:
(a) about 5 to about 25 weight % gelatine,
(b) about 25 to about 60 weight % filler material,
(c) about 15 to about 40 weight % water,
(d) about 0.5 to about 2 weight % cellular structure promoting agent, and,
(e) about 10 to about 30 weigh % lubricating compound;
wherein the remaining balance of the composition is made up from components selected from one or more of the following: about 1 to about 5 weight % gluten, about 1 to about 5 weight % starch, about 1 to about 5 weight % of one or more alkaline earth metals and optionally minor amounts of any one of the following: colourants, fungicides, perfumes and deodorisers.

In certain embodiments the composition including a cellular structure promoting agent may be used to produce a sheet with a cellular structure of various thicknesses. These sheets were found to have increased resilience, low thermal conductivity, increased sound dampening characteristics as well as a high fire rating. As such, the sheet material produced in this way was found to be suitable for a variety of applications such as for pipe lagging and an underlay for flooring assemblies. In addition, the composition may be used as a component in mattress construction due to its resilience and high fire rating. Accordingly, the thickness of the sheet material including a cellular structure may very from less than 1 mm to 8 mm for applications including acoustic sheeting for building constructions, underlay for flooring assemblies and pipe lagging up to 100 mm to 250 mm for mattress construction.

The cellular structure of the composition also unexpectedly increased the Sound Transmission Loss (STL) for a given weight by about 3 to 4 dB which is a significant advantage over and above the prior art products such as loaded vinyl.

The cellular structure of the composition once cured was also found to increase the resilience of the sheet material. It was also found that when the sheet material of the present invention was combined with a further layer bonded thereto (for example: a needle punched polyester sheeting), there was a marked increase in the impact insulation when the sheet material was used as a sound proofing underlay providing a floor acoustic/impact noise treatment. Indeed when tested, it was found to provide up to a 6 STAR impact insulation rating.

Again due to the cellular structure of the composition once the sheet material is formed the sheet material provides a heat resistance (0.082 W/mK) @ 23 Deg C. mean temp, 50-70% R.H) and a good vapour permeability resistance 8.19×10-15 Kg/Pa·m2.

In a further embodiment, the sheet material with a cellular structure may be bonded to a construction panel such as for example a plasterboard panel to produce a composite building material. Indeed in a further embodiment the sheet material with a cellular structure may be sandwiched between two construction panels such as plasterboard to produce a composite building material. The sheet material with a cellular structure may be situated between the construction panel in one continuous layer, or alternatively in discrete spaced apart sections.

The construction panel may be composed of any common construction panel material such as for example plaster board, plywood and fibro.

Such a composite building material may be used in a variety of applications where a construction panel may be used with the added benefit of providing a construction panel with increased sound insulation properties from conventional construction panels.

In an embodiment where the sheet material with a cellular structure is bonded to one side of a constructional panel, the resulting composite building material may be cut to size by first scoring or cutting through the side of they composite material including the sheet material with a cellular structure. The composite building material may then be snapped or folded to break through the construction panel layer along the line of the score/cut thereby providing the composite building material in the desired size for a building application.

In certain embodiments the process for producing a sheet material in accordance with the present invention includes the following steps:
a. preparing a composition including the steps of:
1. dissolving about 1 to about 5 weight % magnesium chloride in about 15 to about 40 weight % water at a temperature of about 80° C. (this step takes about 5 minutes);
2. dissolving about 5 to about 25 weight % gelatine into the water and magnesium chloride in step 1. to form a mixture (this step takes about 45 minutes);
3. adding a filler such as calcium carbonate to about half of the 10 to about 30 weight % glycerine to form a first glycerine mixture and heat for about 0.5 hours at about 75 to 80° C.;
4. dispersing about 1 to about 5 weight % gluten into the second half of the glycerine to form a mixture at a temperature of about 55° C. (this step takes about 15 minutes);
5. Add the mixture from step 3 to the mixture from step 4 to produce a mixture.
6. mixing the mixture from step 2 and the mixture from step 5 to form a mixture (this step takes about 15 minutes);
7. adding about 1 to about 5 weight % starch in the form of tapioca to the mixture of step 6 and dissolving the tapioca to form a mixture (this step takes about 15 minutes);
8. adding about 0.5 to about 2 weight % of a cellular structuring agent such as in the form of sodium percarbonate to the mixture of step 7 about 1 to about 15 minutes before step b.
b. extruding the composition onto a flat surface to form a sheet; and
c. allowing the sheet to cure.

In an alternative embodiments the process for producing a sheet material in accordance with the present invention includes the following steps:
a. preparing a composition including the steps of:
1. dissolving about 1 to about 5 weight % magnesium chloride in about 15 to about 40 weight % and then adding about 5 to about 15 weight % of a lubricating compound such as glycerine and heat the resulting mixture from about 80° C. to about 95° C.;
2. dissolving about 5 to about 25 weight % gelatine into the mixture of step 1 to form a mixture;
3. dispersing about 1 to about 5 weight % gluten into about 5 to about 15 weight % of a lubricating compound such as glycerine to form a mixture;
4. adding the mixture of step 2. to the mixture of step 3. to form a mixture;
5. adding about 1 to about 5 weight % starch such as in the form of tapioca and about 25 to about 60% filler material such as calcium carbonate and/or barium sulphate to the mixture of step 4. and agitate to eliminate lumps to form a mixture;
6. adding about 0.5 to about 2 weight % of a cellular structuring agent such as in the form of sodium percarbonate to the mixture of step 5. about 1 to about 15 minutes before step b.
b. extruding the composition onto a flat surface to form a sheet; and
allowing the sheet to cure In a preferred embodiment the cellular structuring agent, such as sodium percarbonate, is mixed with an amount of glycerine prior to being added before step b. The addition of the glycerine means that the cellular structuring agent is added in the form of a suspension which provides the delivery of the cellular structuring agent into the mixture prior to step b. does not clump or clog which can sometimes occur if the cellular structuring agent is in the form of a powder.

A further advantage of the composition for forming the sheet material with a cellular structure is that once the cellular structuring agent is included with the remainder of the composition, the composition may be formed into a sheet using any applicable process such as by pouring the composition onto a horizontal surface, extruding the composition or moulding the composition. The composition then cures at ambient temperature, without the addition of any further energy for example by heating the composition. The composition will also cure in conditions with high humidity.

In another embodiment of the present invention, the sheet material produced by the composition, or the process as described herein, is used as the basis of a multi layered sheet material. In this embodiment further materials in sheet form are bonded to one or both of the planar faces of the sheet material to produce a multi layered sheet material.

In one embodiment thermally bonded polyester sheeting, which has been laminated on one planar surface with an additional foil layer, is adhered to one, or both, sides of the sheet material prepared from the composition described herein during production. The planar surface of the thermally bonded polyester sheeting that does not include the additional foil layer is bonded prior to the composition curing to form the sheet material. Once the sheet material cures a strong adhesion is formed between the sheet material and the thermally bonded polyester sheeting. The resultant multi layered sheet material was found to have the desirable properties including: increased strength and tear resistance and water resistance.

It was found that the thermally treated polyester bonded strongly to the composition as herein described before curing and there was no need for any further adhesive or glue. The pattern appearing on the foil planar face of the thermally bonded polyester or 'Pimple' look also helps to scatter high frequencies (over 1000 Hz) and also provides heat reflection. The multi layered sheet material provides a flexible noise barrier from that has a foil reflective layer on both sides, which makes it water resistant/heat resistant (heat transfer) and allows the product to be used in various applications such as for example as an 'acoustic sarking'.

The present invention will become better understood from the following examples of preferred but non-limiting embodiments thereof.

Example 1

A sample was produced from a composition with the following constitution:

| | |
|---|---|
| 9% weight | gelatine |
| 37% weight | calcium carbonate |
| 27% weight | water |
| 2% weight | magnesium chloride |
| 18% weight | glycerine |
| 2% weight | gluten |
| 3% weight | tapioca starch |
| 1% weight | sodium percarbonate |

With the balance of the composition being made up of other components such as for example colouring agents.

The preparation of the composition involved dissolving the magnesium chloride in water at a temperature of about 80° C. for about 5 minutes and then dissolving the gelatine into the mixture at the same temperature whilst mixing for a period of 45 minutes. In the meantime, half of the total amount of glycerine is brought to a temperature of about 55° C. to which the calcium carbonate is added, the mixture of glycerine and calcium carbonate is then heated for a period of about 30 minutes to a temperature of about 75 to 80° C. Gluten is then dispersed throughout the remaining half of the glycerine over a period of 15 minutes at 55° C. The glycerine calcium carbonate mixture and the glycerine gluten mixture are then combined to form a second mixture. The original mixture including the water, magnesium chloride and gelatine was then mixed for a period of 15 minutes with the second mixture until a homogenous composition resulted. The tapioca was then added to the homogenous composition and dissolved therein which typically takes about 15 minutes of stirring. The sodium percarbonate is then added to the composition just before the mixture is poured in the form of a sheet.

Example 2

A sample of a sheet material with a cellular structure was produced from a composition with the following constitution:

| | |
|---|---|
| 13% weight | gelatine |
| 41% weight | calcium carbonate |
| 26% weight | water |
| 1% weight | magnesium chloride |
| 13% weight | glycerine |
| 2% weight | gluten |
| 3% weight | tapioca starch |
| 1% weight | sodium percarbonate |

With the balance of the composition being made up of other minor constituents such as for example colouring agents, deodorisers and fungicides.

The preparation of the composition involved preparing a first mixture by dissolving the magnesium chloride in the water and then adding half of the amount of glycerine required and then heating the resulting mixture to a temperature of greater than 95° C. The gelatine was then added and dissolved in the first mixture.

A second mixture was prepared by taking the remaining glycerine and blending the gluten therein to form the second mixture which was then added to the first mixture to form a combined mixture.

The tapioca starch and the filler in the form of calcium carbonate was then added to the combined mixture and stirred aggressively to eliminate lumps after which the resulting mixture was heated to around 76 to 78° C.

The cellular structuring agent was then prepared by pulverising sodium percarbonate into a powder. The powdered sodium percarbonate was then blended with glycerine to form a slurry to aid in the addition of the sodium percarbonate to the combined mixture.

The production of the sheet material then involved blending the sodium percarbonate slurry with the combined mixture using a screw mixer/feeder to form the uncured composition just prior to feeding the uncured composition onto a blade coating table which forms the uncured composition into a continuous sheet with a cellular structure.

The continuous sheet is then allowed to cure forming the sheet material with a cellular structure which was found to have a weight of 2.5 kg/m$^2$.

Figure 1:
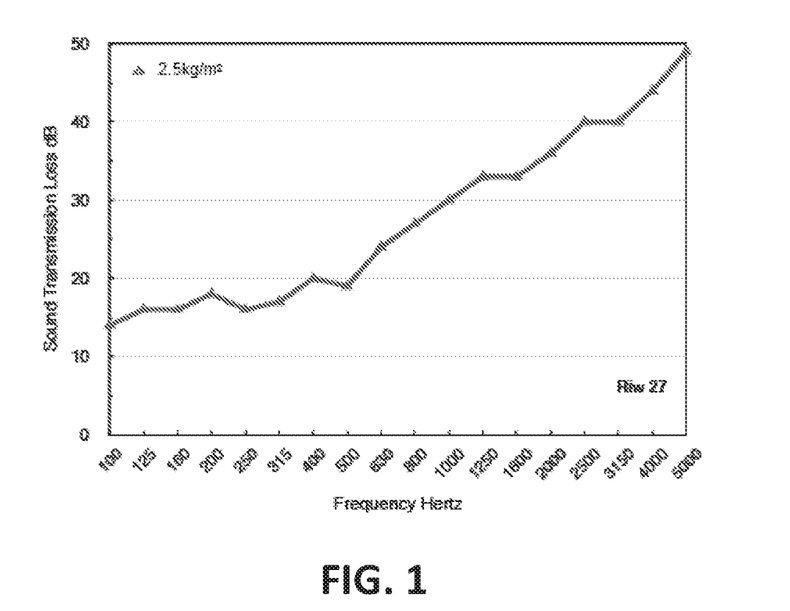
FIG. 1 shows the acoustic properties of a sheet material of weight 2.5 kg/m$^2$ tested using a standard "Sound Intensity Probe".

The acoustic properties of the sheet material were then tested using a standard "Sound Intensity Probe" as accepted under the US Standards and ISO, the results of which are illustrated in FIG. 1 and shown below:

| Frequency (Hertz) | Sound Transmission Loss (dB) |
|---|---|
| 100 | 14 |
| 125 | 16 |
| 160 | 16 |
| 200 | 18 |
| 250 | 16 |
| 315 | 17 |
| 400 | 20 |
| 500 | 19 |
| 630 | 24 |
| 800 | 27 |
| 1000 | 30 |
| 1250 | 33 |
| 1600 | 33 |
| 2000 | 36 |
| 2500 | 40 |
| 3150 | 40 |
| 4000 | 44 |
| 5000 | 49 |

Figure 2:
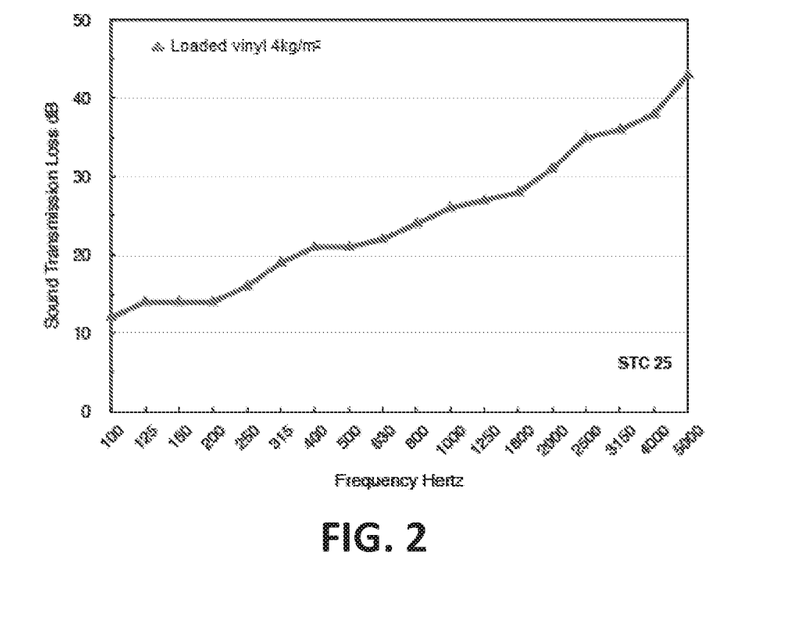
FIG. 2 shows the acoustic properties of a loaded vinyl sheet material of weight 4 kg/m$^2$ using the standard "Sound Intensity Probe".

These results may be compared to a loaded vinyl sheet material of weight 4 kg/m$^2$ which produced the results illustrated in FIG. 2 and shown below:

| Frequency (Hertz) | Sound Transmission Loss (dB) |
|---|---|
| 100 | 12 |
| 125 | 14 |
| 160 | 14 |
| 200 | 14 |
| 250 | 16 |
| 315 | 19 |
| 400 | 21 |
| 500 | 21 |
| 630 | 22 |
| 800 | 24 |
| 1000 | 26 |
| 1250 | 27 |
| 1600 | 28 |
| 2000 | 31 |
| 2500 | 35 |
| 3150 | 36 |
| 4000 | 38 |
| 5000 | 43 |

From a comparison of the results for the sheet with a cellular structure of weight 2.5 kg/m² and the results for the loaded vinyl sheet material of weight 4 kg/m² it can be seen that the sheet with a cellular structure has significantly better STL (Sound Transmission Loss) results for many applications because the sound vibration dissipates at a faster rate than shown with the loaded vinyl sheet.

Many modifications will be apparent to those skilled in the art without departing from the scope of the present invention.

The invention claimed is:

1. A composition for producing a sheet material with a cellular structure, the composition including the following components:
   (a) about 5 to about 25 weight % gelatine,
   (b) about 25 to about 60 weight % filler material, wherein the density of the filler material is about 2.0 to about 5.0 g/cm³,
   (c) about 15 to about 40 weight % water,
   (d) a cellular structure promoting agent, wherein the cellular structure promoting agent is selected from a composition including a peroxide group or a persulfate group, and
   (e) an alkaline earth metal chloride.

2. A composition according to claim 1 wherein the cellular structure promoting agent is sodium percarbonate.

3. A composition according to claim 1 wherein the composition includes about 0.5 to about 2 weight % of the cellular structure promoting agent.

4. A composition according to claim 1 wherein the composition further includes a lubricating compound.

5. A composition according to claim 4 wherein the composition includes about 10 to about 30 weight % of the lubricating compound.

6. A composition according to claim 4 wherein the lubricating compound is glycerine.

7. A composition according to claim 1 wherein the composition includes about 1 to about 5 weight % of the alkaline earth metal chloride.

8. A composition according to claim 1 wherein the alkaline earth metal chloride is magnesium chloride.

9. A composition according to claim 1 wherein the composition further includes gluten.

10. A composition according to claim 9 wherein the composition includes about 1 to about 5 weight % gluten.

11. A composition according to claim 1 wherein the composition includes starch.

12. A composition according to claim 11 wherein the starch is included in the form of tapioca starch.

13. A composition according to claim 11 wherein the composition includes about 1 to about 5 weight % starch.

14. A composition according to claim 1 wherein the gelatine has a bloom of between about 220 and about 260.

15. A composition according to claim 1 wherein the gelatine has a bloom of about 250.

16. A composition according to claim 1 wherein the gelatine is type-B gelatine.

17. A composition according to claim 1 wherein the composition includes about 5 to about 15 weight % of gelatine.

18. A composition according to claim 1 wherein the filler material is selected from calcium carbonate and/or barium sulphate.

19. A composition according to claim 1 wherein the composition includes about 30 to about 50 weight % of the filler material.

20. A composition according to claim 1 wherein the filler material is chosen from a combination of calcium carbonate and barium sulphate.

21. A composition according to claim 1 wherein the filler material is calcium carbonate.

22. A composition according to claim 1 further including a fungicide.

23. A composition according to claim 1 further including a deodoriser.

24. A composition according to claim 1 further including a perfume compound.

25. A composition according to claim 1 further including a colourant.

26. A sheet material prepared from a composition according to claim 1.

27. A sheet material according to claim 26 further including a planar sheet material bonded to one or both planar faces of the sheet material to provide a layered sheet material.

28. A sheet material according to claim 27 wherein the planar sheet material is composed of thermally bonded polyester sheeting or needle punched polyester sheeting.

29. A sheet material according to claim 28 wherein the planar sheet material is thermally bonded polyester sheeting and the thermally polyester bonded sheeting is bonded to a further sheet material in the form of aluminium foil.

30. A sheet material according to claim 29 wherein the aluminium foil is bonded to the thermally bonded polyester sheeting using an adhesive in the form of a laminate.

31. A composite building material including a sheet material with a cellular structure prepared from a composition according to claim 1, the sheet material with a cellular structure being bonded to one side of a constructional panel thereby forming the composite building material.

32. A composition for producing a sheet material with a cellular structure, the composition consisting essentially of the following components:
   (a) about 5 to about 25 weight % gelatine,
   (b) about 25 to about 60 weight % filler material, wherein the density of the filler material is about 2.0 to about 5.0 g/cm³,
   (c) about 15 to about 40 weight % water,
   (d) about 0.5 to about 2 weight % cellular structure promoting agent selected from a composition including a peroxide group or a persulfate group, and,
   (e) about 10 to about 30 weigh % lubricating compound, and
   (f) an alkali earth metal chloride.

33. A composition according to claim 32 wherein in addition to components (a) to (e) the remaining balance of the composition is made up from components selected from one or more of the following: gluten, starch, one or more alkaline earth metals, colourant, fungicide, perfume and deodoriser.

34. A process for producing a sheet material with a cellular structure the process including the steps of:
   a. preparing a composition including the steps of:
      i. providing 15 to about 40 weight % water;
      ii. dissolving about 5 to about 25 weight % gelatine into the water to provide a first mixture, wherein about 1 to 5 weight % of magnesium chloride is added to the water after step a.i. and before step a.ii;
      iii. mixing about 20 to about 60 weight % of a filler material into the first mixture to form a second mixture;
      iv. introducing a cellular structure promoting agent to the second mixture to form the composition, the above weight % calculated on the weight of the total composition,
   b. forming the composition into a sheet; and
   c. allowing the sheet to cure, wherein the cellular structure promoting agent is selected from a composition including a peroxide group or a persulfate group.

35. A process according to claim 34 wherein the cellular structure promoting agent is sodium percarbonate.

36. A process according to claim 34 wherein the cellular structure promoting agent reacts with the water in the composition to produce oxygen which provides a cellular structure in the composition which upon curing provides the cellular structure in the sheet material.

37. A process according to claim 34 wherein the preparation of the composition at step a. is conducted at a temperature of about 75° C. to about 90° C.

38. A process according to claim 37 wherein step a. is conducted at a temperature of about 80° C.

39. A process according to claim 34 wherein the filler material at step iii. is calcium carbonate.

40. A process according to claim 34 wherein about 10 to about 30 weight % glycerine is added to the filler material before step a.iii.

41. A process according to claim 34 wherein the cellular structure promoting agent is introduced to the second mixture about 1 minute to about 15 minutes before step b.

42. A process according to claim 34 wherein the cellular structure promoting agent is introduced to the second mixture about 2 minutes before step b.

43. A process according claim 34 wherein step b includes pouring the composition onto a horizontal surface to form a sheet.

* * * * *